May 28, 1940.  H. REBESKI  2,202,430
MEANS FOR SHIFTING FLAPS ON AIRCRAFT
Filed Dec. 30, 1938   2 Sheets-Sheet 2
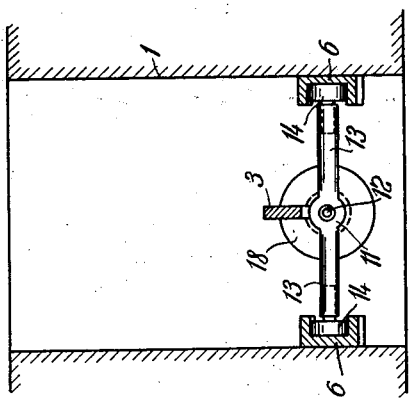
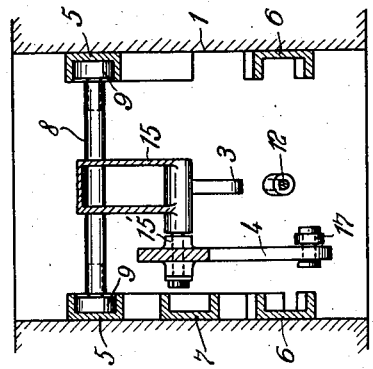
Inventor:
Hans Rebeski,
Bailey & Carson
Attorneys Patented May 28, 1940

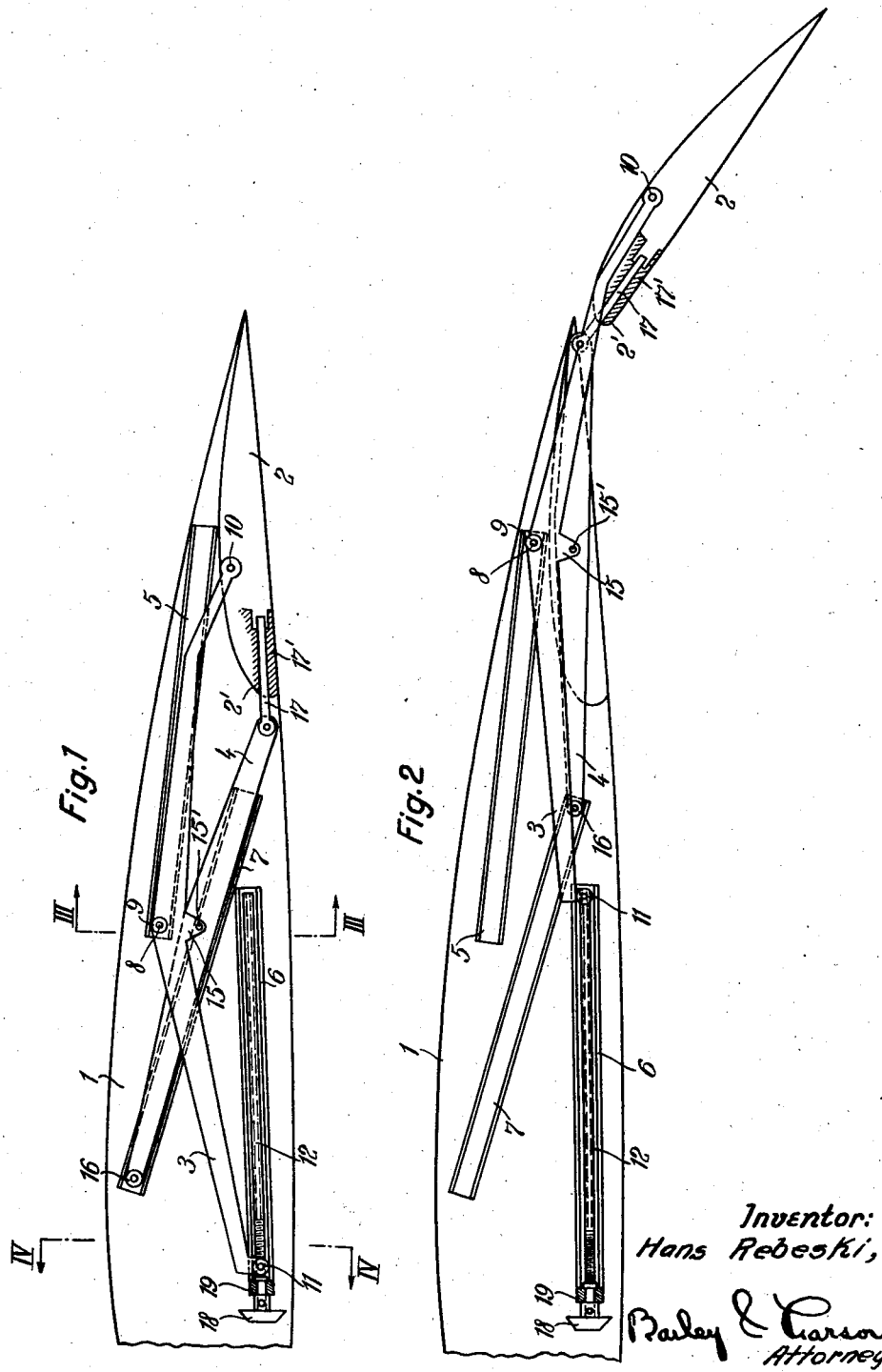

2,202,430

UNITED STATES PATENT OFFICE

2,202,430

MEANS FOR SHIFTING FLAPS ON AIRCRAFT

Hans Rebeski, Brandenburg, Germany, assignor to Arado Flugzeugwerke Gesellschaft mit beschraenkter Haftung, Brandenburg, Germany, a company of Germany Application December 30, 1938, Serial No. 248,612
In Germany January 25, 1938

6 Claims. (Cl. 244—42)

This invention relates to means for shifting flaps or auxiliary wings of aircraft. Such flaps are adapted to be projected rearwardly from the main wing and to turn automatically downwards about an axis transverse to the direction of flight.

There are already known supporting surfaces for aircraft which consist of a main adjustable surface shiftable in relation to the wing and an auxiliary adjustable surface arranged on the lower side of the main adjustable surface, which auxiliary surface takes part in the shifting of the main adjustable surface but can also be shifted independently thereof. To connect the said surfaces with one another and with the supporting wing there are provided pairs of links which form link polygons. The movement of the said surfaces is effected by push rods which are connected to the said links. On outward movement the surfaces incline downwards. In the retracted position of said surfaces all the actuating members and the links lie within the wing profile.

Such wing constructions suffer from the disadvantage that, on account of the particular arrangement of the links, the said surfaces cannot be extended so far rearwardly as is necessary for the optimum extension of the supporting surfaces, i. e., to an extent such that the leading edge of the main adjustable surface comes to lie adjacent to the rear edge of the associated wing in front of it.

There are also known wing arrangements in which from the rear part of the main wing a flap can be extended and at the same time swung downwards until its leading edge lies approximately beneath the trailing edge of the main wing. In these constructions the flap is secured centrally to outriggers which project from the main wing. It is true that the above mentioned disadvantages are thus avoided to a certain extent, but these known proposals, on account of the use of outriggers which in the retracted position of the flap project from the main wing, have the disadvantage of presenting additional air resistance.

The invention avoids the disadvantages aforesaid by providing a wing arrangement consisting of a main wing and a flap with a shifting device in which in the retracted position of the flap no securing or actuating members extend into the air stream, the flap, moreover, being capable of being extended so far that the most favourable lift is obtained.

These advantages are attained in the present invention by the flap being secured to the ends of two double-armed levers pivotally connected with one another at the central part. One of these levers is shiftable at the central part by means of a pin in a guide arranged on the main wing and is connected at the forward end with a drive or gearing disposed also in the main wing, while the other lever is shiftable with one end on the nose portion of the auxiliary wing and with the other in a guide on the main wing.

One embodiment of the invention is illustrated by way of example in the accompanying drawings, in which Fig. 1 is a side view of the new arrangement with the flap in retracted position.

Fig. 2 shows the same arrangement with the flap extended.

Fig. 3 shows to enlarged scale a section on the line III—III of Fig. 1; Fig. 4 shows to the same scale as Fig. 3 a section on the line IV—IV of Fig. 1.

Referring to the drawings, there are mounted in the main wing 1 two double-armed levers 3 and 4. The lever 3 is penetrated midway of its length by a shaft 8 on each end of which is mounted a roller 9, Fig. 3. Each of these rollers can move in a channel rail 5 disposed within the main wing. The lever 3 is also pivotally attached at one end by means of a pin 10 to the flap 2. The other end of the lever 3 is formed as a nut 11 in screw-threaded engagement with a spindle 12 mounted in the main wing 1 in a bearing 19, and on rotation of the spindle 12 moves therealong. The nut 11 is provided at both sides with pin-like projections 13 (Fig. 4) on the ends of which are mounted rollers 14 which engage in rails 6 provided in the main wing at both sides of the spindle. The rotation of the spindle 12 is effected, by way of example, by means of a bevel pinion 18 which is connected with a known drive (not shown) which can be actuated from the pilot's cockpit of the aircraft.

On the lever 3 there is provided beneath the pin 8 a lug 15 which carries a bearing sleeve for supporting a pivot pin 15' (Fig. 3). By means of this pin 15' the other double-armed lever 4 is pivotally connected to the lever 3. One end of this lever 4 is guided by means of a roller 16 in a single inclined rail 7 in the main wing. At the other end of the lever 4 is pivotally connected a rod 17 which is shiftable in a slideway 17' on the nose portion 2' of the flap 2.

The operation is as follows:

With the flap 2 in retracted position the several parts are in the position shown in Fig. 1. When the flap 2 is to be extended, the pilot actuates the control device (not shown) and the spindle 12 is rotated by means of the bevel pinion 18. The nut 11 mounted on the spindle 12 and the lever 3 then move to the right of Fig. 1. The path of movement of the lever 3 is determined by the shaft 8 guided in the rail 5. The lever 4 by virtue of its connection with the lever 3 takes part also in this movement. In consequence of the inclined position of the guide rail 7, on protruding the flap the lever 4 is so rocked that the flap 2 is swung downwardly. On suitable continuation of the rotary movement of the spindle 12 the several parts finally reach the position shown in Fig. 2. The extent of swinging movement of the flap 2 can be increased or reduced by changing the inclination of the rail 7 to the desired requirements.

The guides 5 and 7 are, in general, rectilinear guides. It may, however, be preferable, in order to obtain definite characteristics of movement for the flap, to provide guides of definite curvature. For example by a movable arrangement of the guides and by movement of these guides during the outward movement of the flap an arbitrary and additional controllability of the flap can be obtained without modifying the essence of the invention.

Finally, the same arrangement may be used to shift a flap provided on the leading edge of the main wing.

I claim:

1. In an aeroplane, the combination with a main wing of a flap adapted to be protruded from said main wing and to be automatically swung downwards about an axis transverse to the direction of flight of the aeroplane, two double-armed levers pivotally connected with one another at their central portions and each operatively connected at one end to said flap, a guide in said main wing, a pin at about the central portion of one of said levers, said pin being movable in said guide, actuating means located in the main wing and connected to the second end of said lever, a second guide in said main wing, the second end of the second of said levers being guided for movement in said second guide, the connection of the first end of said second lever with the flap being movable.

2. In an aeroplane, the combination claimed in claim 1, in which the first lever is provided midway of its length with a downwardly extending lug to which the second lever is pivoted.

3. In an aeroplane, the combination claimed in claim 1 in which the second guide is arranged at an inclination.

4. In an aeroplane, the combination claimed in claim 1, a rod pivotally secured to the end of the second lever connected with the flap, and a guide in said flap in which said rod is shiftable.

5. In an aeroplane, the combination claimed in claim 1, a nut formed on the forward end of the first lever, and a rotatable screw-threaded spindle engaging said nut.

6. In an aeroplane, the combination claimed in claim 1, a nut connected on the forward end of the first lever, a rotatable screw-threaded spindle engaging said nut, rollers carried by said nut and rails arranged in the main wing at both sides of and parallel to the spindle for guiding said rollers.

HANS REBESKI.